UNITED STATES PATENT OFFICE.

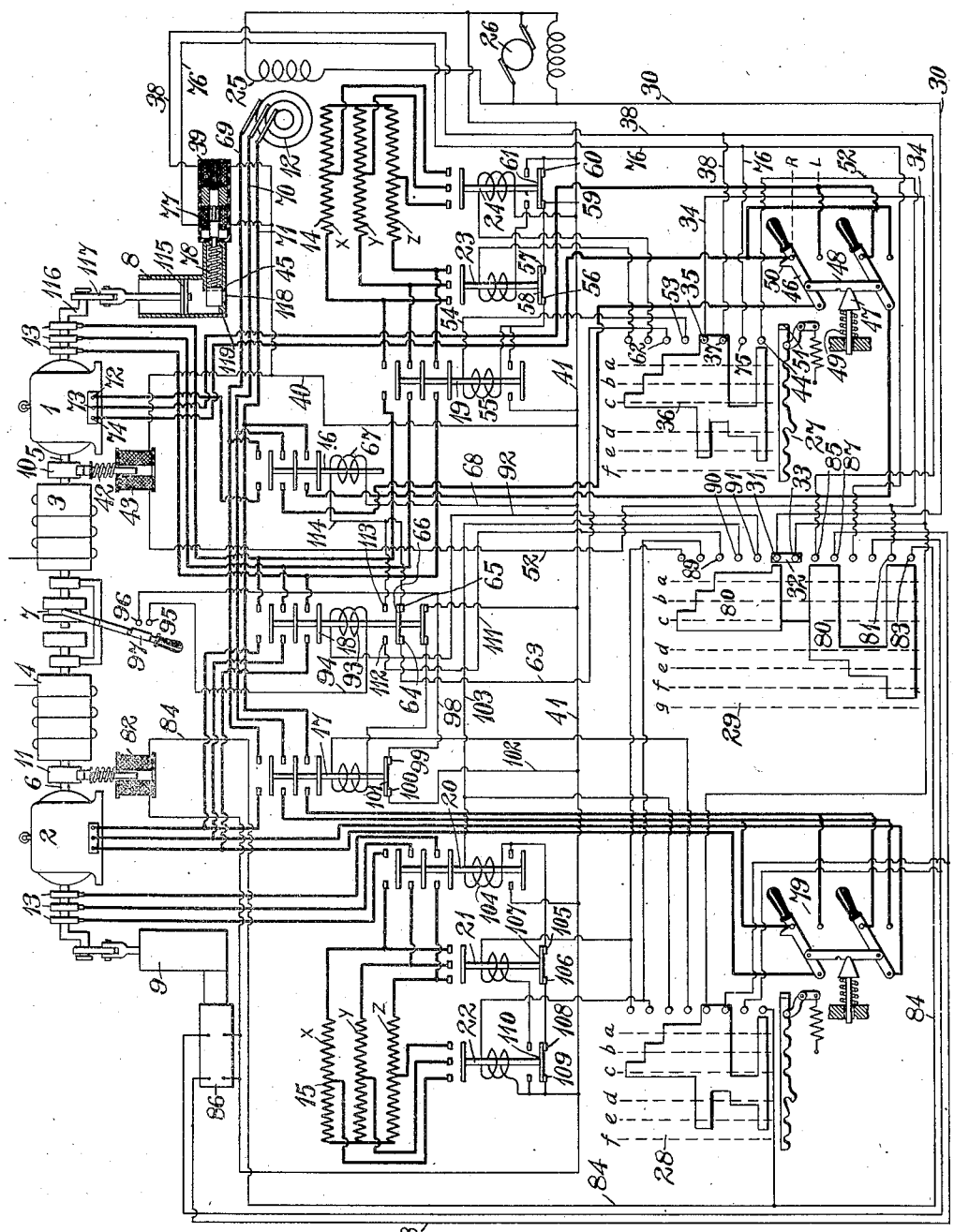

GIRARD B. ROSENBLATT, OF BUTTE, MONTANA, ASSIGNOR TO WESTINGHOUSE ELECTRIC & MANUFACTURING COMPANY, A CORPORATION OF PENNSYLVANIA.

ELECTRIC-MOTOR CONTROL.

No. 896,249.          Specification of Letters Patent.      Patented Aug. 18, 1908.

Application filed December 27, 1906. Serial No. 349,694.

*To all whom it may concern:*

Be it known that I, GIRARD B. ROSENBLATT, a citizen of the United States, and a resident of Butte, in the county of Silverbow and State of Montana, have invented a new and useful Improvement in Electric-Motor Control, of which the following is a specification.

My invention relates to systems of electric motor control, and has special reference to systems for controlling induction motors which are adapted for hoist service.

The object of my invention is to provide a system of the class above indicated that shall be simple in arrangement and that shall permit the independent control of two motors or the control of both motors connected in concatenation.

It is often desirable, in the operation of mines, or for other similar purposes, to provide a hoist that comprises two winding drums which are located at the head of two similar mine shafts and which are adapted to raise or lower suitable cages as the drums are rotated in one direction or the other. The two drums are disposed on separate shafts, which are usually in alinement with each other and which may be mechanically connected by a clutch mechanism. Suitable steam driving engines have heretofore been adapted to operate the drums, in arrangements of this kind, and by means of the intermediate clutch mechanism the two hoisting devices could readily be operated to serve the two mine shafts independently, one drum being stationary and the other operating, or both being operated to raise or lower the cages at the same time. One of the drums was usually underwound and the other overwound, so that if one should be raising its load while the other was lowering its load, the two hoisting devices could be connected by the clutch mechanism and the action of gravity on the descending load would assist in raising the other load.

According to my present invention, I employ, instead of the steam driving engines usually employed, two similar electric motors of the induction type and provide a system of control therefor, whereby either motor may be operated independently of the other, or both motors may be operated in concatenation or in multiple, depending on the speed and direction in which it is desirable to rotate the drums. Means are further provided for efficient braking at high, medium and low speeds by operating the motors, as generators above synchronous speed, by the use of air-pumping cylinders, the valves of which are electrically controlled and by friction brakes which are electro-magnetically released.

The single figure of the accompanying drawing, is a diagrammatic view of a control system arranged in accordance with my invention, one of the air-pumping cylinders which are used for braking at medium speeds being shown in sectional elevation.

Referring to the drawing, two similar induction motors 1 and 2 are arranged to drive winding drums 3 and 4 which are respectively overwound and underwound. The drums are mounted upon rotatable shafts 5 and 6 which are substantially in alinement with each other and which are adapted to be mechanically connected by means of a clutch mechanism 7. The motors 1 and 2 are respectively provided with air-pumping cylinders 8 and 9 and friction brakes 10 and 11.

The stationary primary members of the motors may be supplied with three-phase alternating current energy from any convenient source such as a generator 12 and rotating secondary members of the motors are provided with collector rings 13 so that external and stationary resistances 14 and 15 may respectively be included in the secondary circuits of the motors 1 and 2. A plurality of electrically operated control switches 16, 17, 18, 19, 20, 21, 22, 23, and 24 are adapted to connect either or both motors to the supply circuit and to control the amount of resistance included in the secondary of each. The generator 12 is provided with a field magnet winding 25 that is supplied with direct current energy from an exciter 26 which may also serve as a source of supply for the electro-magnets by which the several control switches are operated. The entire operation of both motors is controlled by a plurality of drums 27, 28, and 29, which may be of well known construction and which are engaged by a plurality of contact fingers. The several drums are shown, as developed into a single plane and for safety of operation in practice the drums may be mechanically interlocked as hereinbefore explained.

The drums 27 and 28 are adapted to respectively control the motors 1 and 2 independently and the drum 29 is adapted to effect a cascade connection between the two motors which may only be employed when the two motors are mechanically connected by the clutch mechanism 7.

When the drum 27 occupies its off position, assuming that the drum 29 also occupies its off position, energy is supplied from the exciter 26 through a positive line conductor 30, contact finger 31, contact ring segment 32 of the drum 29, contact finger 33, and conductor 34, to contact finger 35 of the drum 27. From the contact finger 35, which is in engagement with a contact ring segment 36, circuit is completed through contact finger 37, conductor 38, magnet winding 39 and a conductor 40 to a negative line conductor 41 of the exciter 26. The friction brake 10 is applied by a spring 42 when the controller is in this position since its release magnet 43, which acts in opposition to the spring and which is normally energized during the operation of the motor by the engagement of a contact finger 44 with the ring segment 36, is deënergized. The energizing of the magnet 39 serves to open a valve 45 of the air-pumping cylinder 8 to its full extent so that this cylinder will not in any way interfere with the operation of the motor.

The direction of rotation of the motor 1 is determined by the position occupied by the reversing switch 46 which may occupy two positions, one for raising the load and the other for lowering the load in the shaft of the mine. The two positions of this switch are accentuated by a pawl 47, which is held in engagement with notches in a connecting strip 48 by means of a spring 49. When the reversing switch 46 occupies position $r$, the movement of the control drum is limited to the occupation of positions $a$, $b$, and $c$ by means of a projection 50 on the switch which is adapted to engage the projection 51 on the drum so that when the reversing switch occupies the position $l$ the drum 27 is free to rotate through a complete revolution, passing successively through positions $a$, $b$, $c$, $d$, $e$, and $f$, all of which may be accentuated in a well known manner, as illustrated in Patent No. 807937, granted to the Westinghouse Electric & Manufacturing Company as assignee of Henry D. James, such that a continuous rotation of the drum is permitted in one direction, while it is impossible to return from the position $d$, which is a braking notch, to the position $c$ without first passing through the off position.

Assume that the reversing switch 46 occupies the position $r$ and that the drum 27 occupies the position $a$, energy is supplied, as already described, to the ring segment 36 from which point circuit is completed through contact finger 44, conductor 52, magnet winding 43 of the brake 10 and the conductor 40 to the negative line conductor 41. The magnet 43, when energized, moves the magnet core in opposition to the spring 42 and releases the friction brake 10. Energy is also supplied from the ring segment 36 through contact finger 53, conductor 54, operating magnet 55 of the switch 19, contact members 56 and 57, which are bridged by a contact member 58 when the switch 23 is open, and contact members 59 and 60, which are bridged by contact member 61 when switch 24 is open, to the negative line conductor 41. Energy is further supplied from the ring segment 36 through contact finger 62, conductor 63, contact fingers 64 and 65, which are connected by a bridging contact member 66 when switch 18 is open, to the operating magnet 67 of the switch 16, from which point the circuit is completed through a conductor 68 to the negative line conductor 41.

The magnets 55 and 67, when energized, close the switches 19 and 16 after which energy is supplied from the main generator 12 through line conductors 69, 70, and 71, switch 16 and reversing switch 46, to terminals 72, 73, and 74 of the motor 1. Collector rings 13 of this motor are interconnected through sections $x$, $y$, and $z$ of the resistance 14 since the switch 19 is closed, consequently, when the control drum 27 occupies the position $a$, the motor 1 is started and will operate at a relatively low speed by reason of the resistance 14 which is included in its secondary circuit. As the drum 27 is moved to occupy successively positions $b$ and $c$, the resistance sections $x$, $y$, and $z$ are reduced and entirely short-circuited by the successive closure of the switches 24 and 23. When the reversing switch 46 is in its present position, the drum 27 may not be moved any farther in the same direction and, in order to stop the motor, it is necessary to move the control drum 37 back through positions $b$ and $a$ to the off position. When the reversing switch is in this position the motor so operates as to raise the load which is connected to the drum 3.

Assuming that the motor is again brought to rest and that it is desirable to lower the load at a relatively high speed, the reversing switch is thrown to the position $l$ which reverses the current in one leg of the primary winding of the motor. If drum 27 is now moved to position $a$ the friction brake 10 will be released as before and the motor will accelerate by reason of the downward pull produced by the load and also by the energy applied to the motor until the speed has reached a value somewhat above synchronous speed when the motor acts as a generator and supplies current to the line in parallel with the main generator 12 and, by reason of this action, a further acceleration of the motor is prevented. As the control drum 27 is moved to occupy the positions $b$ and $c$ the resistance is reduced as hereinbefore explained, and the speed of the motor is brought down more nearly to that of synchronism. If it is desirable to still further reduce the speed, the control drum may be moved to the position d in which the contact finger 37 is out of engagement with the ring segment 36 so that the magnet winding 39 is deënergized and a contact finger 75 engages the ring segment 36 so that the energy is supplied through a conductor 76 to an electro-magnet 77, from which point circuit is completed through conductor 40 to the negative line conductor 41. The electro-magnet 77, when energized, partially closes the valve 45 of the air-pumping cylinder 8 and consequently, this device now serves to retard the speed of the motor. When the controller occupies the position e, the contact finger 75 is disengaged from the ring segment 36 so that both magnet windings 39 and 77 will be deënergized and the valve 45 of the air-pumping cylinder will be closed by a spring 78 which acts in opposition to the magnets. The closure of this valve still more retards the rotation of the motor 1 and finally, as the drum completes a revolution and returns to its off position, the friction brake 10, which is adapted to bring the speed of the motor to zero, is applied.

The independent control of the motor 2 may be effected by the control drum 28 and a reversing switch 79 exactly as the motor 1 is controlled by the drum 27 and the reversing switch 46, the air-pumping cylinder 7 corresponding to the air-pumping cylinder 8 of the motor 1 and the friction brake 11 corresponding to the brake 10 of the motor 1.

In some instances it may be desirable to operate both motors in multiple-circuit when they are mechanically connected by the clutch mechanism 7 and in order that such control may be effected advantageously, it will probably be desirable to provide means whereby the drums 27 and 28 may be mechanically interlocked, but as means for effecting such results are well known in the art, I deem it unnecessary to illustrate any specific device.

In order that the motors may be efficiently operated at a moderate speed when they are mechanically connected by the clutch mechanism 7, the control drum 29, which is adapted to effect connection of the two motors in cascade or concatenation is provided. When so connected, the primary of the motor 1 is supplied with energy from the generator 12, while the primary of the motor 2 is connected directly to the collector rings of the motor 1 and the speed regulation of the set is brought about by the variation of resistance 15 which is included in the secondary circuit of the motor 2.

Assuming that the clutch mechanism effects a mechanical connection between the shafts of motors 1 and 2, if the control drum 29 is moved from its off position to position a, contact fingers 31 and 33 become disengaged from the bridging member 32 so that the source of energy is entirely disconnected from the contact fingers which formerly supplied the ring segments of the drums 27 and 28 and energy is now supplied through contact finger 31 to a contact ring segment 80 of the control drum 29 with which it is in engagement.

From the ring segment 80 energy is supplied to the release magnet 43 of the brake 10 through contact finger 81 and conductor 52 and to a corresponding release magnet 82 of the friction brake 11 through a contact finger 83 and conductor 84. Energy is further supplied to electro-magnet winding 39 of the air-pumping cylinder 8 through contact finger 85 and conductor 38. The corresponding magnet winding 86 of the air-pumping cylinder 9 is energized through the contact of a finger 87 with the ring segment 80 which is connected to the magnet winding by a conductor 88. The ring segment 80 is so formed that the contact fingers 85, 87, 81, and 83 first move into engagement therewith as the controller is moved from the off position to position a thereby releasing the braking devices for both motors prior to the application of electrical energy to the motor windings. Immediately after the aforesaid fingers have moved into engagement with the ring 80, contact fingers 89, 90, and 91 move into engagement with the ring so that the circuit is now completed from the ring segment 80 through contact finger 91, conductor 92, actuating magnet 93 of the switch 18, conductor 94, contact fingers 95 and 96 which are bridged by a contact member 97 when the motors 1 and 2 are mechanically connected, conductor 98, contact fingers 99 and 100 which are bridged by a contact member 101 when switch 17 is open and conductor 102 to the negative line conductor 41. The magnet 92, when energized, closes the switch 18 which connects the primary of the motor 2 to the collector rings 13 of the motor 1. Another circuit is completed from the ring segment 80 through contact finger 90, conductor 103, actuating magnet 104 of the switch 20, contact fingers 105 and 106, that are bridged by a contact member 107 when the switch 21 is open, and contact fingers 108 and 109, which are connected by a contact member 110, when the switch 22 is open, to the negative line conductor 41. The magnet winding 104, when energized, closes the switch 20 which connects the sections x, y, and z of the resistance 15 to the collector rings 13 of the motor 2, thereby including said resistance in the secondary of the motor. Finally the closure of the switch 16 will be effected by the magnet winding 67, when energized, since a third circuit is completed from the ring segment 80 through contact finger 89, conductor 111, contact fingers 112 and 113, which are connected by the contact member 66 when the switch 18 is closed, conductor 114, magnet winding 67 and conductor 68, to the negative line conductor 41. The direction of rotation of the motors 1 and 2, when they are connected in cascade, is entirely dependent upon the position of the reversing switch 46. As the control drum 29 successively occupies positions $b$ and $c$, switches 21 and 22 are closed so that a part, and finally the whole, of the sections $x$, $y$, and $z$ of the resistances 15 are short-circuited. The various positions of this control drum may be accentuated in a manner similar to that described for drum 26 and the drum may be similarly constrained to return from the braking positions $d$, $e$, and $f$ to the starting position $a$, without first passing through the running position $c$.

When the maximum speed of the motors connected in cascade is reached, if it is desirable to further increase their speed, the drum 80 may be returned to its off position and the drums 27 and 28, which may be mechanically interlocked, as hereinbefore indicated, may be utilized for connecting the two motors in multiple-circuit with the resistances 14 and 15 first included in their respective secondary circuits and finally short-circuited for full speed.

Reference may now be had to the sectional elevation of the air-pumping cylinder 8 having a piston 115, that is connected to the motor shaft 5 by means of a crank 116 and a crank shaft 117. The upper end of the cylinder is open, but the lower end is closed except for a port 118 which may be entirely uncovered to allow the free passage of the air as the shaft 5 rotates or may be partially or substantially covered by a slide valve 45, which is normally held in engagement with a projection 119 on the inside of the cylinder by the spring 78, but which may be released to uncover the opening 118 by the electro-magnet windings 77 and 39 acting in opposition to the spring.

It will, of course, be understood that various modifications may be effected within the scope of my invention. Any suitable source of alternating or direct current energy may be employed for operating or for governing the operation of the control switches, the movement of which may be effected pneumatically or otherwise. The design of the switch operating or governing magnets will, of course, be determined in each instance by the character of energy to be utilized. Alternating current energy of any suitable frequency and of any desired number of phases may likewise be employed for driving the asynchronous motors, providing they are designed for the phase relations and frequency to be utilized.

The springs illustrated in the drawings may be replaced by weights for applying the friction brakes and the design of the pneumatic brakes may be modified to suit the motor speeds and other conditions of operation. Furthermore, it may be found advantageous in some cases, to omit the pneumatic brakes altogether.

Although the system illustrated and described is specially well adapted for mining hoist service, I desire that it shall not be restricted thereto and that only such limitations shall be imposed as are indicated in the appended claims.

I claim as my invention:

1. In a system of electric motor control, the combination with two asynchronous motors, and means for mechanically coupling the motors together, of a controlling means operative to connect the motors in concatenation only when the motors are coupled together.

2. In a system of electric motor control, the combination with two asynchronous motors, and means for mechanically coupling the motors together, of means for operating either or both motors independently and means operative only when the motors are mechanically coupled to connect the motors in concatenation.

3. In a system of electric motor control, the combination with two asynchronous motors, a mechanical coupling between the motors, and a suitable resistance for each motor, of controlling means for operating either or both motors independently and for varying the resistance in their rotor circuits, and means for operating the motors in concatenation and for varying the resistance in the rotor circuit of the second motor of the cascade, said means being operative only when the motors are mechanically coupled.

4. In a system of electric motor control, the combination with a source of alternating current supply, two asynchronous motors, and a mechanical clutch coupling between the motors, of means for connecting either or both motors independently to said alternating current source, and means for connecting the stator of one motor to said source and the stator of the second motor to the rotor of the first, said means being operative only when the motors are mechanically connected.

5. In a system of electric motor control, the combination with the asynchronous motor, and a friction brake therefor, of an air-pumping cylinder, a piston eccentrically connected to the motor shaft, and means for regulating the braking effect produced by the air-pumping cylinder.

6. In a system of electric motor control, the combination with a source of alternating current, an asynchronous motor, a friction brake therefor, an air-pumping cylinder, a piston therefor that is eccentrically connected to the motor shaft, and a valve for the cylinder, of a plurality of electrically operated control switches and a master switch having a plurality of positions whereby the stator of the motor may be connected to said source, the resistance in the rotor circuit may be varied, the motor may be disconnected from the source of supply, the valve of the air-pumping cylinder may be regulated to vary the braking effect produced thereby and the friction brake may be applied.

7. In a system of electric motor control, the combination with a source of alternating current, an asynchronous motor having a primary winding on the stator, a wound secondary on the rotor, a stationary resistance therefor, an electrically released friction brake, a braking device comprising an air-pumping cylinder, an electrically controlled valve, and a piston eccentrically connected to the motor shaft, of a controller for the motor whereby the resistance in the secondary circuit may be varied, the valve of the air-pumping cylinder may be regulated and the friction brake may be applied.

8. In a system of electric motor control, the combination with two asynchronous motors, and means for mechanically coupling the motors together, of a plurality of control switches therefor, and selective motor controllers for governing either or both motors independently, and means for connecting both motors in cascade, and for governing the motors when connected together, the cascade connection and control being effected when the motors are mechanically coupled.

9. In a system of electric motor control, the combination with a source of alternating current, asynchronous motors, electrically released friction brake, air-pumping cylinders having electrically controlled valves, and a piston eccentrically connected to the motor shaft and a mechanical coupling between the motors, of means for controlling the motor connections and regulating the application of the braking device.

10. In a system of electric motor control, the combination with a source of alternating current, asynchronous motors, electrically released friction brake, air-pumping cylinders having electrically controlled valves, and a piston eccentrically connected to the motor shaft and a mechanical coupling between the motors, of means, comprising a plurality of electrically - operated control switches and a master controller, for controlling the motor connections and regulating the application of the braking device.

11. In a system of electric motor control, the combination with two electric motors and means for mechanically coupling the motors together, of controlling means operative to associate the motor circuits only when the motors are coupled together.

In testimony whereof, I have hereunto subscribed my name this eleventh day of December 1906.

GIRARD B. ROSENBLATT.

Witnesses:
AGNES JOHNSON,
H. W. BYERS.